Patented Sept. 18, 1934

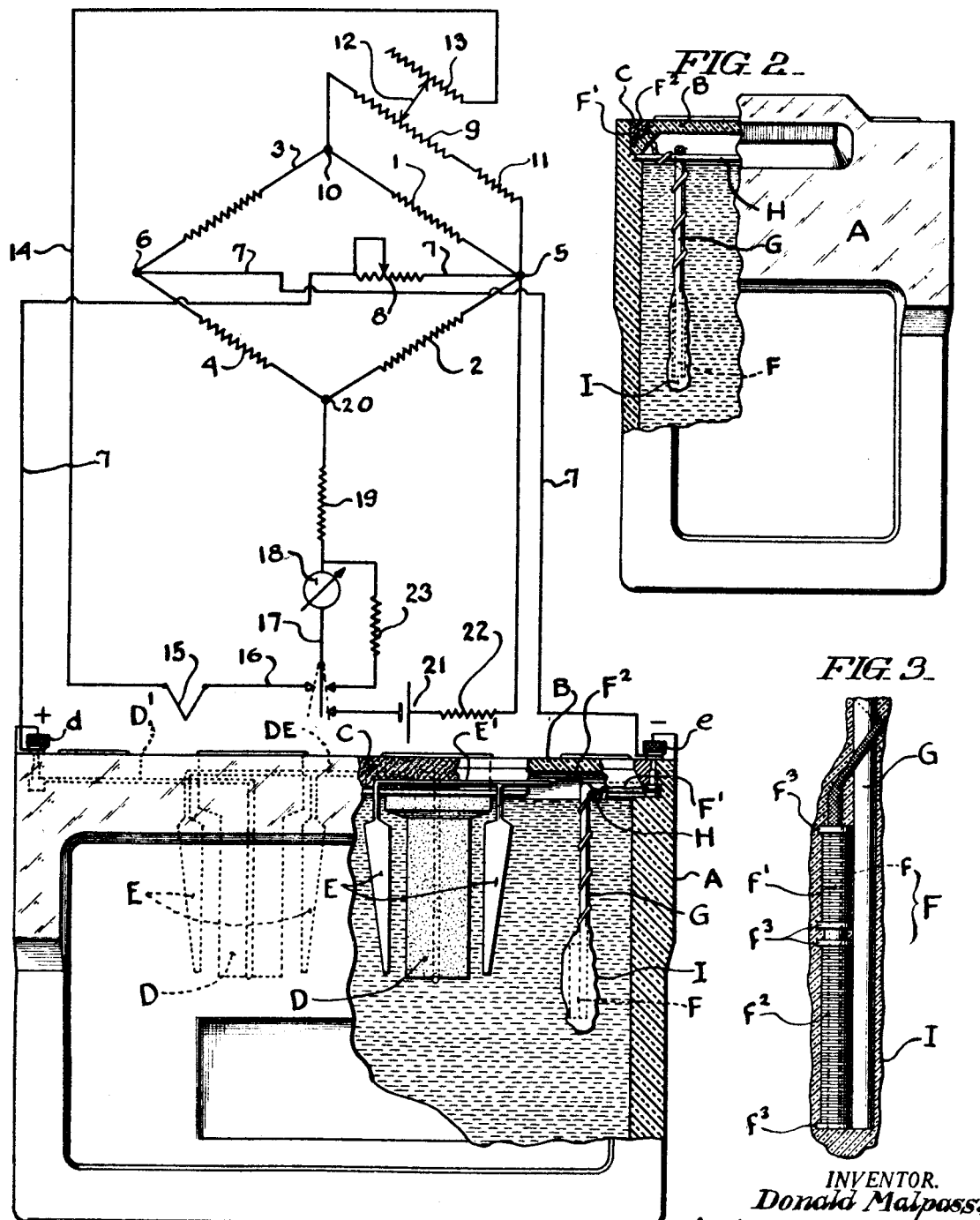

1,974,187

UNITED STATES PATENT OFFICE 1,974,187

MEASURING APPARATUS

Donald Malpass, Elkins Park, Pa., assignor to The Brown Instrument Company, Philadelphia, Pa., a corporation of Pennsylvania Application November 1, 1932, Serial No. 640,630

5 Claims. (Cl. 136—2)

My present invention relates to measuring apparatus including an electrical measuring circuit, and particularly a potentiometer circuit having a slide wire resistance, and including a voltaic cell for creating a definite current flow through said circuit and thereby creating definitely different potential conditions at different points in the circuit. In the practical use of such apparatus, desirable accuracy of measurement is obtainable only when the circuit energizing current created by the cell departs but little from a predetermined constant value. Any departure from said value results in measuring inaccuracy and unless such departure is kept very small, it results in prohibitively large measurement errors with apparatus used, as most apparatus of the kind is used, to secure highly accurate measurements of minute differences in potential. One source of departure from the desired energizing constancy arises from the fact that the cell voltage or E. M. F. of voltaic cells practically available and desirable for use as the source of energizing currents in such apparatus, increases and decreases as the cell temperature increases and decreases. By the term "cell" as used herein, I mean to include not only a cell comprising a single cooperating pair of electrodes, but also a battery in which the number of electrodes is increased to thereby increase the cell capacity.

The general object of the present invention is to provide simple and effective means for automatically and continuously neutralizing the tendency of variations in cell voltage, resulting from variations in cell temperature, to modify the circuit energizing current created by the cell. This object is attained in accordance with the present invention by including in the energizing circuit proper, a compensating resistance having such a temperature coefficient of resistance and so associated with the cell that, as the cell temperature rises and falls the tendency of the resultant change in cell voltage to modify the energizing current will be substantially neutralized by the corresponding temperature-produced change in the resistance value of the compensating resistance. In the preferred practical embodiment of the invention, the compensating resistance is connected in series with the cell electrodes and is immersed in the cell electrolyte.

Heretofore numerous proposals have been made for the use of compensating resistances the resistance value of which vary with their temperatures in, and in connection with, measuring circuits, but, so far as I am aware, no practically operative arrangement of such a resistance has been used, or proposed for use, to compensate for the effect of temperature-produced cell voltage variations on the accuracy of the measurements obtained with a measuring circuit energized by said cell voltage, although such circuits are now, and long have been in extensive use.

So far as I am aware, the only compensation for the effect on the energizing current flow through measuring circuits due to cell temperature variations produced by cell temperature changes heretofore obtained in the practical art, has been the imperfect and intermittent compensation obtained with certain instruments differing from the more usual instruments of the practical art in that they include automatic provisions for a rheostat adjustment of resistance in circuit with the energizing cells. Such automatic provisions effect what is commonly referred to as battery or standard cell calibration, or recalibration, and are not provided primarily to compensate for the effects of temperature change on cell voltage, but to compensate for the constant tendency of the cell voltage to slowly decrease with the effective cell life, or length of time during which the cell is used. In practical instruments including such automatic recalibrating provisions, the latter usually effect recalibration operations only at intervals of an hour or two, or at less frequent intervals, greater frequency of recalibration being practically prohibitive, because each recalibration operation interrupts the normal measuring operation of the instrument. Instrument recalibration at intervals of an hour or two obviously provides imperfect compensation for the voltage varying effects of cell temperature changes, as the cell temperature may vary considerably during the period between successive recalibration operations.

The compensation provided for by the present invention is continuous and practically free from time lag. Furthermore, my means for obtaining compensation for the effect of cell temperature variations possesses an important practical advantage from the standpoint of instrument simplicity and reliability over instruments giving some approximation to such compensation by virtue of their inclusion of automatic recalibration provisions. The latter add considerably to the complication in construction and operation of the instruments of which they form a part, and which, because of their nature and duties, are inherently complicated even when they do not include such provisions. Moreover, the frequency of recalibration required to insure any reasonable approximation to effective compensation for cell voltage variations due to temperature changes, is much greater than the frequency of recalibration required to compensate for a decrease in cell voltage resulting from cell age or extent of use. With cells now practically available and desirable for use in energizing measuring circuits, a battery or standard cell recalibration once a month or so will adequately compensate for cell aging, and will reduce the measurement errors due to that cause to the magnitude of the errors produced in a measuring circuit not including my invention, by a cell temperature variation of 30° F. or so. While automatic recalibration provisions of the character referred to have long been known, their practical use has never been extensive, as suitably frequent manual recalibrations to compensate for cell aging can be so quickly and easily made as to make the additional instrument complication and increased construction cost involved in the use of automatic recalibrating provisions undesirable in the opinion of most instrument makers and users.

The various features of novelty which characterize my invention are pointed out with particularity in the claims annexed to and forming a part of this specification. For a better understanding of the invention, however, and the advantages possessed by it reference should be had to the accompanying drawing and descriptive matter in which I have illustrated and described a preferred embodiment of the invention.

Of the drawing:

Fig. 1 is a view showing a potentiometer instrument circuit diagram and showing the energizing cell thereof in side elevation with parts broken away and in section;

Fig. 2 is an end elevation partly broken away and in section of the cell shown in Fig. 1; and Fig. 3 is an elevation on a larger scale and in greater detail of a cell compensating resistance shown in Figs. 1 and 2.

In Fig. 1, I have diagrammatically illustrated the essential circuit features of a commercial form of measuring circuit including a potentiometer slide wire resistance and energized in accordance with the present invention. Before describing the novel features illustrated in Fig. 1, however, I shall first describe the features shown therein which are typical of the prior art.

The circuit shown in Fig. 1 comprises a Wheatstone bridge, the four arms 1, 2, 3, 4 of which are formed by or include suitable resistances. The bridge energizing circuit or circuit branch 7 is connected between the junction 5 of the bridge arms 1 and 2 and the junction 6 of the bridge arms 3 and 4, and includes an energizing cell A and the usual adjustable or rheostatic resistance 8 in series with the cell. The potentiometer slide wire resistance 9 is connected between the bridge junctions 5 and 10 in a shunt about the bridge arm 1, said shunt also including a ballast resistance 11 in series with the slide wire resistance. The potentiometer balancing contact 12 engages, and is adjustable along the length of the slide wire resistance 9 and serves to connect the point of the latter engaged by it to a corresponding point in a slide wire resistance 13 extending alongside the resistance 9. One end of the resistance 13 is connected by a conductor 14 to one terminal of the source of potential difference to be measured, said source being shown as a thermo-couple 15. The second terminal of the thermo-couple may be connected by a conductor 16 and switch 17 to one terminal of a galvanometer 18. The second terminal of the galvanometer 18 is connected through a resistance 19 to the junction 20 of the bridge arms 2 and 4.

In the normal contemplated use of the apparatus diagrammatically shown in Fig. 1, the switch 17 is periodically moved from its normal open position shown in Fig. 1, into the position in which it connects the adjacent terminals of the thermo-couple 15 and galvanometer 18. When so connected the galvanometer deflects in one direction or the other or remains neutral accordingly as the electromotive force of the thermo-couple exceeds, or is less than, or is equal to the opposing potential difference between the bridge junction 20 and the point of the slide wire resistance 9 engaged by the contact 12. When the two opposing potential differences are not equal, the contact 12 is then adjusted along the resistance 9 to increase or decrease the potential difference opposing the thermo-couple voltage as required to neutralize the latter and eliminate the current flow through and deflection from neutral, of the galvanometer. The ordinary potentiometer instrument of the practical art employed with such a circuit as is shown in Fig. 1 is a self-balancing instrument including means for periodically adjusting the switch 17 to connect the galvanometer 18 to the thermo-couple 15, and including relay mechanism, not shown in Fig. 1, through which the deflection of the galvanometer then automatically adjusts the contact 12 if and as necessary to make the potential difference between the bridge junction 20 and contact 12 equal and opposite to the thermo-couple voltage.

The E. M. F. of any known cell available for practical use as the energizing cell A is used, diminishes, as the age or period of use of the cell increases. This aging effect on cell voltage is customarily corrected for by periodical reductions in the amount of the rheostatic resistance 8 in series with the cell. With the arrangement shown in Fig. 1, the extent of adjustment of the resistance 8 required at each adjustment operation is determined in the customary manner by moving the switch 17 to the right to connect the corresponding terminal of the galvanometer 18 to one terminal of a standard cell 21 which has its other terminal connecting through a resistance 22 to the bridge junction 5 of the bridge arms 1 and 2. When the standard cell 21 is thus connected in circuit, the energizing current can be brought to its proper value by adjusting the resistance 8 in circuit until the galvanometer ceases to deflect from its neutral position. The mode of adjustment of the resistance 8 just described is commonly referred to as battery calibration or standard cell calibration or recalibration. To prevent excessive deflection of the galvanometer in effecting standard cell recalibrations, when the amount of resistance 8 previously in circuit varies considerably from the proper amount, a shunt about the galvanometer including a resistance 23 is provided so as to be closed by the switch 17 when the latter is shifted to connect the standard cell in circuit.

In respect to its features described in detail above, the apparatus shown in Fig. 1 contains nothing now novel with me, but on the contrary is typical of prior art apparatus in which my novel cell compensating invention may be used with advantage. It may not be amiss to point out, however, that in accordance with the teaching of the prior art, the resistances in different bridge arms 1, 2, 3 and 4, may have different temperature coefficients to provide compensation for variations in the so-called thermo-couple cold junction temperature. While this modifies the bridge resistance to the current energization flow slightly, its principal and intended effect is to slightly modify the relative potential drops in different portions of the bridge circuit, and it produces no change in the strength of the bridge energizing current furnished by the cell A which needs to be taken into account in understanding or in making use of the present invention.

The particular cell A shown in the drawing is a non-rechargeable wet cell of commercial form and commercially known as an "air cell", which has been found especially well adapted for practical use in energizing such a measuring circuit as the potentiometer circuit illustrated in Fig. 1.

As shown, the cell housing comprises a rectangular cup shaped body and a removable cover plate B, which, when the cell has been assembled, is sealed in place by a suitable insulating and sealing compound C filling a trough shaped enlargement provided for the purpose, of the upper portion of the joint between the cell body and the cover B. In use, the cell body is filled nearly to its top with a suitable electrolyte, which in the particular commercial cell mentioned above is a sodium hydroxide solution, and in which the electrodes are suspended. As shown there are two carbon electrodes D, and four zinc electrodes E, one at each side of each carbon electrode D, and the two sets of electrodes are connected in series, so that the electrode voltage of the cell is double the voltage of one carbon and one zinc electrode combination. At its opposite ends the cell body carries terminals or binding posts $d$ and $e$. The carbon electrode D adjacent the terminal $d$ is connected to the latter by a conductor D'. The two zinc electrodes E adjacent the last mentioned carbon electrode are connected by a conductor DE to the second electrode D. The lead or conductor E' from the zinc electrodes E adjacent the last mentioned carbon electrode is connected through the compensating resistance element F to the terminal $e$.

In the form of the invention shown in Figs. 1 and 2, the temperature compensating resistance element F is immersed in the electrolyte adjacent the end of the cell at which the binding post $e$ is located, and has one terminal F' connected to that binding post and has its other terminal F² connected to the lead or conductor E' from the zinc electrodes which, but for the use of the present invention, would be directly connected to the binding post $e$. The resistance element F is thus connected in series with the cell electrodes between the cell binding posts $e$ and $d$.

As will be obvious the resistance element F may be constructed and supported in various ways to secure the desired mechanical stability and strength and to avoid short circuiting or corrosive attack by the electrolyte. The supporting means illustrated comprises a bent rod or hanger G having a main vertical portion and a short upper horizontal portion which extends over a transverse supporting bar H. The latter is used in such cells not including my invention to indicate the level to which the cell should be filled with electrolyte, and is anchored at its ends to the cell housing. The hanger G and the bar H may be formed of metal and spot welded together. The resistance element F is fastened to the lower portion of the bar G and as shown extends between upper and lower levels, respectively above and below the lower ends of the electrodes.

As shown in Fig. 3, the resistance element or unit F comprises a shaft $f$ surrounded by two end to end resistor coils $f'$ and $f^2$ connected in series and arranged between collars $f^3$ carried by the shaft $f$. The wires forming the coils $f'$ and $f^2$ are suitably insulated, and the resistance element or unit is suitably secured to the support G. Advantageously the element and the bar G are separately dipped in a hot bath of asphalt or like material, after which the element and part G are pressed together while the asphalt coating thus given them are still sufficiently plastic to insure their adherence. Thereafter the assembled parts F and G are advantageously again dipped in a bath of hot asphalt or like material, to provide a common enclosing casing I which adds to the insulation and provides protection against corrosive action by the electrolyte. The leads F' and F² which may be individually encased in rubber or the like, are advantageously encased collectively in a flexible sheath or conduit, and are coiled about the vertical portion of the support G and about the adjacent portion of the bar H, thereby adding to the security of the connection between the parts G and H. The end portions of the leads F' and F², connected to the binding post $e$, and the electrode lead E', respectively, are advantageously embedded in the sealing material C, as shown.

For the purposes of the present invention, the resistance value and temperature coefficient of the element F should be so related to the voltage or E. M. F. of the cell A and to the desired strength of energizing current, that the potential difference impressed by the energizing circuit 7 on the bridge at the junction points 5 and 6, will be approximately constant throughout the normal range of cell temperature variation. If Q represents the potential difference between the battery terminals $d$ and $e$ when the current flow C through the cell is of the desired value, and QC and QR represent the cell electrode voltage or E. M. F., and the potential drop through the resistance F, respectively, then $$Q = QC - QR$$

As will be apparent, in order that cell temperature variations will not affect the value of Q if QC and QR similarly increase and decrease in response to the same cell temperature variation. Theoretically, the compensation obtained by such similar changes in QC and QR would be modified by the reduction which should be made as previously described in the amount of battery resistance 8 in circuit as the cell ages and the electrode voltage QC diminishes. The decrease in the electrode voltage QC and the reduction in the amount of resistance 8 in circuit directly compensate for one another, however, and if the resistance of the element F is substantial in comparison with the average amount of resistance 8 in circuit, the necessary variation in the latter does not significantly affect the accuracy of the compensation for temperature changes by the element F.

The resistance values and specific temperature coefficients of the material or materials used in the resistance element F may be varied in accordance with conditions, as those skilled in the art and understanding the principles of the present invention will readily understand without further explanation. However, in further illustration of the nature and character of the invention I may state by way of example, and not by way of limitation, that the particular cell A, when new, gives an electrode voltage QC at 75° F., of about 2.8 volts, and that for the normal cell temperature range the voltage QC varies about 0.001 volts for each degree Fahrenheit of cell temperature change, and in one form of a commercial instrument employing the circuit shown in Fig. 1, the energizing current supplied by the cell A is approximately 4 milliamperes and that satisfactory compensation is effected in such case with an element F comprising a coil $f'$ made of manganin wire having an approximately zero thermal coefficient of resistance, and having a resistance of about 220 ohms, and comprising a coil $f^2$ of copper having a resistance of about 100 ohms at 75° F. The use of a resistance element composed in part of manganin having a zero coefficient, and in part of copper having a positive coefficient, to form a resistance element having a definite positive coefficient less than that of the copper portion of the element is in accordance with principles well known in the art.

The above described cell A is especially advantageous for the use illustrated in Fig. 1 because of the relative ease with which the compensating element F can be incorporated therein so as to respond directly and immediately to the temperature changes affecting the electrode voltage of the cell. It is especially advantageous for such use, also, because it ages very slowly. With the small current drain required for such use, its effective life is several years, and its decrease in voltage with age is so relatively slight as to make battery, or standard cell, recalibrations at intervals of a month or so quite frequent enough in ordinary practical use.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention what I claim as new and desire to secure by Letters Patent, is:

1. In measuring apparatus, the combination with a measuring circuit including a resistance, of means for creating a predetermined potential drop in said resistance, said means comprising a voltaic cell the E. M. F. of which varies with the cell temperature and a resistance associated with said cell and subjected to the same temperature conditions and having such resistance and resistance temperature co-efficient values that with a constant predetermined current flow through the cell, on changes in said temperature the resulting variations in said E. M. F. are substantially compensated for by the corresponding changes in the last mentioned resistance.

2. In measuring apparatus, the combination with a measuring circuit including a resistance, of means for creating a predetermined potential drop in said resistance, said means comprising a cell having electrodes and an electrolyte in contact with said electrodes and giving an E. M. F. which varies with the cell temperature and comprising an insulated resistance in contact with said electrolyte and having such resistance and temperature coefficient values that with a constant predetermined current flow through the cell, on changes in said temperature the resulting variations in said E. M. F. are substantially compensated for by the corresponding changes in the last mentioned resistance.

3. In measuring apparatus, the combination with a potentiometer resistance, of energizing means therefor comprising a voltaic cell, the E. M. F. of which varies with its temperature and a temperature compensating resistance in series therewith and having such a temperature coefficient and resistance value that with a predetermined constant current flow through said cell, the difference between said E. M. F. and the potential drop through said resistance remain approximately constant as the temperature of said cell and resistance similarly vary.

4. In measuring apparatus, the combination with a potentiometer resistance, of energizing means therefor comprising a voltaic cell and a compensating resistance, said cell comprising an electrolyte and electrodes in contact therewith and said resistance being insulated and connected in series with said electrodes and being immersed in said electrolyte and having such a positive temperature coefficient and resistance value that with a predetermined constant current flow through said cell the difference between said E. M. F. and the potential drop through said resistance will remain approximately constant as the cell temperature varies.

5. In measuring apparatus, a circuit energizing cell comprising a cell housing, an electrolyte in said housing, electrodes within and supported by said housing and in contact with said electrolyte and a resistance having a positive temperature coefficient supported by said housing and immersed in said electrolyte and connected in series with said electrodes, the temperature coefficient and ohmic value of the resistance being such that the difference between the E. M. F. between the electrodes and the potential drop through the resistance remains substantially constant as the temperature of the cell varies.

DONALD MALPASS.